(12) United States Patent
Handshaw et al.

(10) Patent No.: US 8,727,218 B1
(45) Date of Patent: May 20, 2014

(54) SYMMETRIC CUSTOMER SIDE SCANNER FOR BIOPTIC REAR TOWER

(71) Applicant: Symbol Technologies, Inc., Schaumburg, IL (US)

(72) Inventors: Darran M. Handshaw, Sound Beach, NY (US); Mark E. Drzymala, St.James, NY (US); Joseph D. Giordano, Bayville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/776,860

(22) Filed: Feb. 26, 2013

Related U.S. Application Data

(60) Provisional application No. 61/748,467, filed on Jan. 3, 2013.

(51) Int. Cl.
*G06K 7/00* (2006.01)
(52) U.S. Cl.
USPC ............................. 235/440; 235/439; 235/454
(58) Field of Classification Search
USPC ................ 235/440, 454, 462.01–462.45, 439
See application file for complete search history.

(56) References Cited

U.S. PATENT DOCUMENTS

| | | | |
|---|---|---|---|
| 5,834,754 A | 11/1998 | Feng et al. | |
| 5,920,061 A | 7/1999 | Feng | |
| 2007/0158430 A1 | 7/2007 | Wiklof et al. | |
| 2007/0290043 A1* | 12/2007 | Russell et al. | 235/462.14 |
| 2008/0210759 A1* | 9/2008 | Roquemore, III et al. | 235/462.43 |
| 2010/0163626 A1* | 7/2010 | Olmstead | 235/462.41 |
| 2012/0007738 A1* | 1/2012 | Barkan et al. | 340/540 |

* cited by examiner

*Primary Examiner* — Edwyn Labaze
(74) *Attorney, Agent, or Firm* — Nong-Quiang Fan

(57) ABSTRACT

A checkout system includes a workstation having a first workstation window located in a generally horizontal plane and a second workstation window located in a generally upright plane. The workstation includes a data capture arrangement for capturing through at least one of the workstation windows target data of targets associated with the products. The workstation also includes a rear cover having a first opening and a second opening. The first opening and the second opening are located on opposite side-walls of the rear cover and substantially identical in size. The first opening allows light from additional targets entering an accessory reader from an accessory window facing the bagging area, but the second opening is covered by a side cover.

20 Claims, 5 Drawing Sheets

SYMMETRIC CUSTOMER SIDE SCANNER FOR BIOPTIC REAR TOWER

RELATED APPLICATIONS

The present application is related to claims benefit under 35 U.S.C. §119(e) from U.S. Provisional Patent Application Ser. No. 61/748,467, filed Jan. 3, 2013, titled "SYMMETRIC CUSTOMER SIDE SCANNER FOR BIOPTIC REAR TOWER", the entire contents of which being incorporated herein by reference.

FIELD OF THE DISCLOSURE

The present invention relates to barcode readers having two windows

BACKGROUND

In the retail industry, bi-optical scanners, each having both a horizontal window and an upright window, have been used to electro-optically read targets, such as one-dimensional bar code symbols, particularly of the Universal Product Code (UPC) type, and two-dimensional bar code symbols, such as PDF417 and QR codes, at full-service, point-of-transaction checkout systems operated by checkout clerks in supermarkets, warehouse clubs, department stores, and other kinds of retailers, for many years. Products to be purchased bear identifying target symbols and are typically slid by a clerk across a respective window, e.g., from right to left, or from left to right, in a "swipe" mode, to a bagging area. Alternatively, the clerk merely presents the target symbol on the product to, and holds the product momentarily steady at, a central region of a respective window in a "presentation" mode, prior to placing the product in the bagging area. The choice depends on the type of target, on clerk preference, and on the layout of the system.

Some checkout systems are laser-based workstations, and project a multitude of laser scan lines through a respective window. When at least one of the scan lines sweeps over a target symbol associated with a product, the symbol is processed, decoded and read. The multitude of scan lines is typically generated by a scan pattern generator which includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the respective window as a scan pattern of the laser scan lines.

Other checkout systems are imager-based workstations, and have one or more solid-state imagers, or image sensors, analogous to those conventionally used in consumer digital cameras. Each imager has a one- or two-dimensional array of photocells or light sensors (also known as pixels), and an imaging lens assembly for capturing return light scattered and/or reflected from a target being imaged through a respective window over a field of view, and for projecting the return light onto the sensor array to initiate capture of an image of the target over a range of working distances in which the target can be read. The target may be a symbol, as described above, either printed on a label or displayed on a display screen of an electronic device, such as a smart phone. The target may also be a form, such as a document, label, receipt, signature, driver's license, employee badge, or payment/loyalty card, etc., each bearing alphanumeric characters, as well as a picture, to be imaged. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded and/or processed by a programmed microprocessor or controller into data related to the target being electro-optically read, e.g., decoded data indicative of a symbol, or into a picture of a target other than a symbol.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
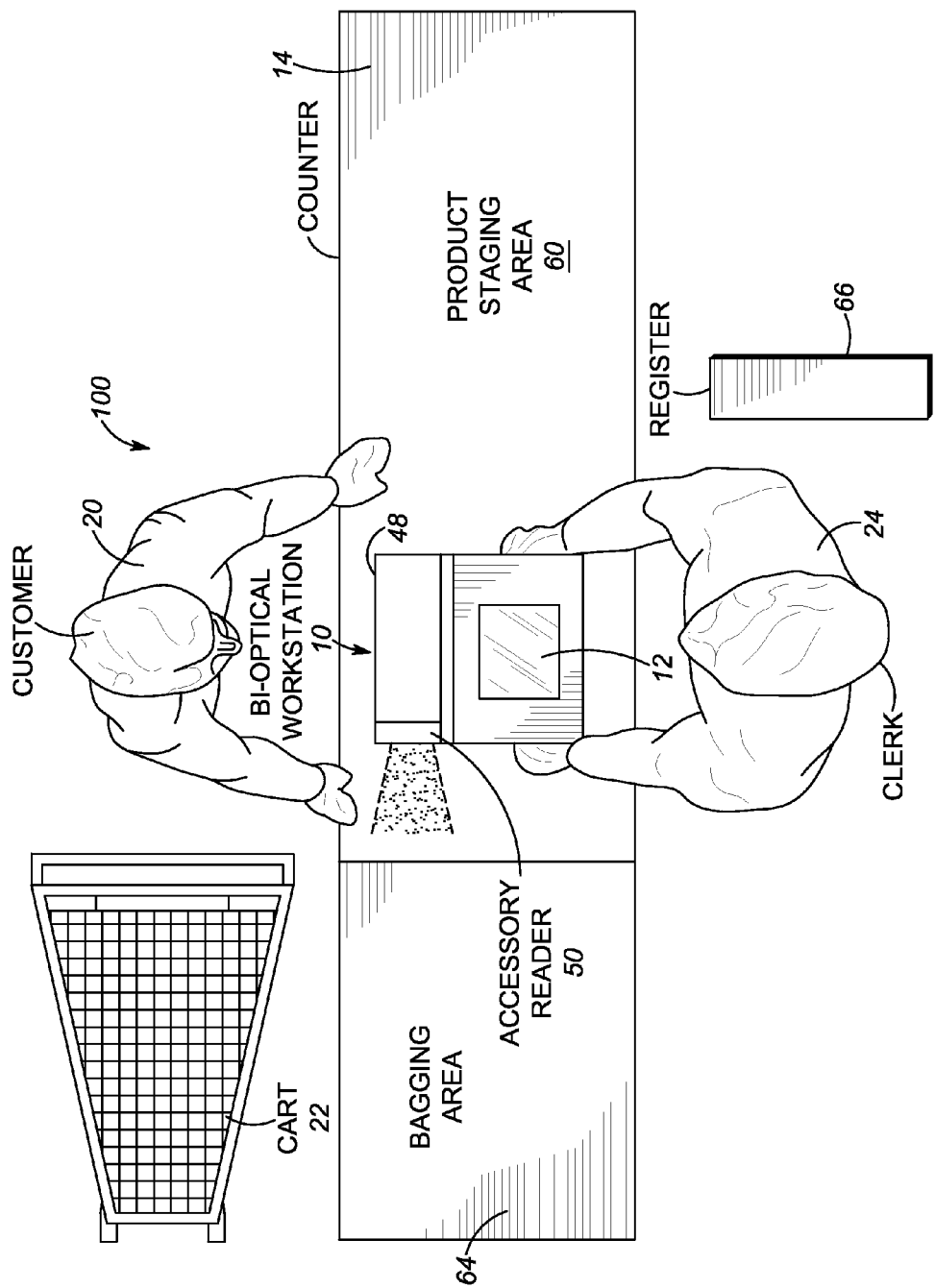
FIG. 1 is a top plan view of a checkout system for processing products associated with targets electro-optically readable by a clerk-operated workstation, and for processing transaction-related items associated with additional targets electro-optically readable by image capture by a customer-operated accessory reader in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein

DETAILED DESCRIPTION

Most of the present bi-optics workstations are typically operated by checkout clerks who pass the products through the workstations to the bagging areas for bagging and customer retrieval. In an effort to reduce, if not eliminate, the need for checkout clerks and their associated labor cost, and to improve the speed and efficiency of the checkout operation, a number of self-service, point-of-sale, checkout systems operated by the customer without the aid of the checkout clerk have been proposed. During operation of a self-service checkout system, the customer retrieves the individual products for purchase from a shopping cart or basket and/or from an entrance conveyor belt at the countertop, and moves the retrieved individual products across, or presents the individual products to, a scanner window to read their respective symbols, and then places the read products onto an exit conveyor belt at the countertop for delivery to the bagging area, for packing in carry-out bags. The customer then pays for his or her purchases either at the self-service checkout system if so equipped with a credit/debit card reader, or at a central payment area that is staffed by a store employee. Thus, the self-service checkout system permits the customer to select, itemize, and, in some cases, pay for his or her purchases, without the assistance of the retailer's personnel.

However, self-service is not readily available if the aforementioned and increasingly popular, bi-optical workstation is installed at a checkout system. The upright window faces the clerk, not the customer. A rear wall of the bi-optical workstation rises from the countertop and faces the customer. As a result, the customer does not have ready access to either window of the bi-optical workstation and cannot assist in the checkout procedure, even if the customer wanted to, because the rear wall blocks such access. This lack of self-service potentially causes such bi-optical workstations to go unused or underutilized, and their expense to be economically unjustified. Bi-optical workstations occupy valuable real estate in a retailer's operation, which might otherwise be used for self-service systems.

In order to have the customer participate in the checkout procedure despite the presence of the bi-optical workstation, it has been proposed to install a supplemental accessory reader having an accessory window at the checkout system. This accessory reader is independently operated by the customer. For example, this accessory reader can be used to read any target, such as a printed code, or an electronic code electronically displayed on a screen of a communications device, e.g., a smartphone, or a non-coded target, independently of the assistance of the clerk, on any item related to the transaction. These transaction-related items might be loyalty cards, identification cards, coupons, smartphones, and even countertop merchandise bought on impulse. For such reasons, among others, as privacy, hygiene, and security, many customers do not wish to hand over identification cards, such as drivers' licenses containing age data, to the clerk, and would instead prefer to operate the accessory reader. Due to the increasing popularity of coupons being delivered over smartphones, and thus the increased likelihood that the customer's smartphone will be handled during checkout, many retailers also prefer that the customer operate the accessory reader out of concern for legal liability in the event that the clerk accidentally drops the customer's smartphone.

Figure 2:
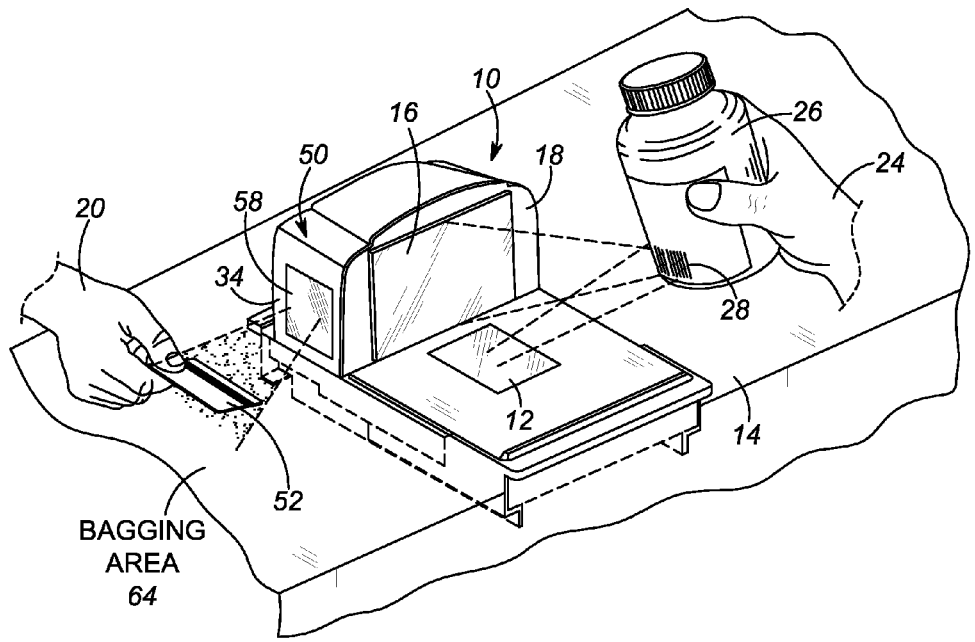
FIG. 2 is a broken-away perspective view of the system of FIG. 1 during reading.
Figure 3:
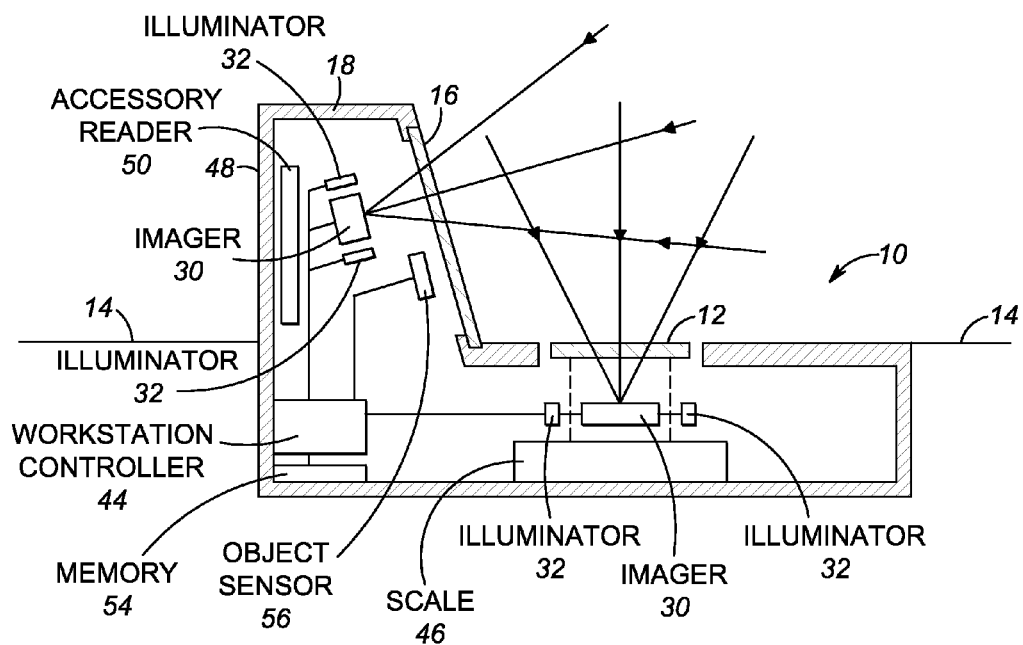
FIG. 3 is a schematic diagram of various components of the workstation of FIG. 1.

A checkout system 100, as depicted in FIG. 1, includes a dual window, bi-optical, point-of-transaction workstation 10 used by retailers at a checkout counter to process transactions involving the purchase of products 26 (see FIG. 2) bearing an identifying target, such as the UPC symbol 28 described above. As best seen in FIGS. 2-3, the workstation 10 has a generally horizontal planar window 12 elevated, or set flush with, a countertop 14, and a vertical or generally vertical, i.e., tilted, (referred to as "upright" hereinafter) planar window 16 set flush with, or recessed into, a raised housing portion 18 above the countertop 14. The workstation 10 either rests directly on the countertop 14, or rests in a well formed in the countertop 14. The raised housing portion 18 has a rear wall 48.

Returning to FIG. 1, both of the windows 12, 16 are positioned to face and be accessible to a clerk 24 standing at one side of the counter for enabling the clerk 24 to interact with the workstation 10, and with a cash register 66 to enable the clerk to receive payment for the purchased products. The register 66 may include a debit/credit card reader and a receipt printer to print a receipt. A keypad may also be provided at the register 66 to enable manual entry of information, such as an identifying code for any purchased product not bearing a symbol, by the clerk 24.

A product staging area 60 is located on the countertop 14 at one side of the workstation 10. The products 26 are typically placed on the product staging area 60 by a customer 20 standing at the opposite side of the counter. The customer 20 typically retrieves the individual products for purchase from a shopping cart 22 or basket for placement on the product staging area 60. A non-illustrated conveyor belt could be employed for conveying the products 26 to the clerk 24.

As previously described, the rear wall 48 of the bi-optical workstation 10 rose from the countertop 14 and faced the customer 20 in the prior art. As a result, the customer 20 did not have ready access to either window 12 or 16 of the bi-optical workstation 10 and could not assist in the checkout procedure, even if the customer 20 wanted to, because the rear wall 48 blocked such access. Thus, in order to have the customer 20 participate in the checkout procedure despite the presence of the bi-optical workstation 10, a supplemental accessory reader 50 is provided at the checkout system 100. This accessory reader 50 is illustrated as being located on, or built into, the workstation 10, but could equally well be located remotely from the workstation 10. This accessory reader 50 is independently operated by the customer 20. This accessory reader 50 can be used to read any additional target, such as a printed code, or an electronic code displayed by a smartphone, or a non-coded target, independently of the assistance of the clerk 24, associated with any item related to the transaction. These additional targets are provided on items 52 (see FIG. 2), such as loyalty cards, identification cards, drivers' licenses, coupons, smartphones, and even countertop merchandise bought on impulse. For reasons of privacy, hygiene, and security, many customers do not wish to hand over identification cards, such as drivers' licenses containing age data, to the clerk 24, and would instead prefer to operate the accessory reader 50 themselves, and, indeed, many retailers prefer this, too, out of concern for legal liability in case the clerk accidentally drops a smartphone.

As schematically shown in FIG. 3, a data capture arrangement, advantageously including a plurality of imaging readers, each including a solid-state workstation imager 30 and an illuminator 32, is mounted at the workstation 10, for capturing light passing through either or both windows 12, 16 from a target that can be a one- or two-dimensional symbol, such as a two-dimensional symbol on a driver's license, or any document. Each workstation imager 30 is a solid-state area array, preferably a CCD or CMOS array. Each workstation imager 30 preferably has a global shutter. Each illuminator 32 is preferably one or more light sources, e.g., one or more surface-mounted, light emitting diodes (LEDs), located at each workstation imager 30 to uniformly illuminate the target.

In use, the clerk 24 processes each product 26 bearing a UPC symbol or target 28 thereon, past the windows 12, 16 by swiping the product 26 across a respective window, or by presenting the product 26 by holding it momentarily steady at the respective window, before passing the product 26 to a bagging area 64 that is located at the opposite side of the workstation 10. The target 28 may be located on any of the top, bottom, right, left, front and rear, sides of the product, and at least one, if not more, of the workstation imagers 30 will capture the illumination light reflected, scattered, or otherwise returning from the target through one or both windows as an image. FIG. 2 also schematically depicts that a weighing scale 46 can be mounted at the workstation 10. The generally horizontal window 12 advantageously serves not only as a weighing platter for supporting a product to be weighed, but also allows the return light to pass therethrough.

As schematically shown in FIG. 3, an object sensor 56 is also mounted at the workstation 10 for detecting when each product 26 enters and exits the workstation 10. The object sensor 56 may advantageously include two pairs of infrared (IR) light emitting diode (LED) emitters and IR detectors. Each IR emitter directs IR light, which is invisible to the human eye, in a wavelength range from about 700 nm to about 1100 nm, over a viewing angle through the workstation window at the target 28 for return therefrom for detection by the IR detector for detecting return IR light returned from the target 28 over an object detection field of view. The viewing angle of each emitter is approximately equal to the object detection field of view of the IR detector for better system efficiency and pointing in the direction of the target. The object detection field of view substantially overlaps the reading field of view. The object sensor 56 need not be IR-based, but could instead be any motion or proximity sensor.

The workstation imagers 30, the associated illuminators 32, and the object sensor 56 are operatively connected to a programmed workstation microprocessor or controller 44 operative for controlling the operation of these and other components. Preferably, the workstation microprocessor 44 is tasked with processing the return light scattered from each target 28, and with decoding the captured target image of the return light. A memory 54 is operatively bidirectionally connected to the workstation microprocessor 44.

In operation, an active mode for the workstation microprocessor 44 is initiated when the object sensor 56 detects that a product 26 has entered the workstation 10. The workstation microprocessor 44 then sends successive command signals to the illuminators 32 to pulse the LEDs for a short time period of 300 microseconds or less, and successively energizes the workstation imagers 30 to collect light from the target 28 only during said time period, also known as the exposure time period. By acquiring a target image during this brief time period, the image of the target 28 is not excessively blurred even in the presence of relative motion between the workstation imagers and the target. A typical array needs about 11 to 33 milliseconds to acquire the entire target image and operates at a frame rate of about 30 to 90 frames per second. The array may have on the order of one million addressable sensors. The active mode ends when the object sensor 56 detects that the product 26 has exited the workstation 10, or when the workstation microprocessor 44 has successfully decoded the target 28. Once the active mode ends, then a standby mode, as described below, begins.

Figure 4:
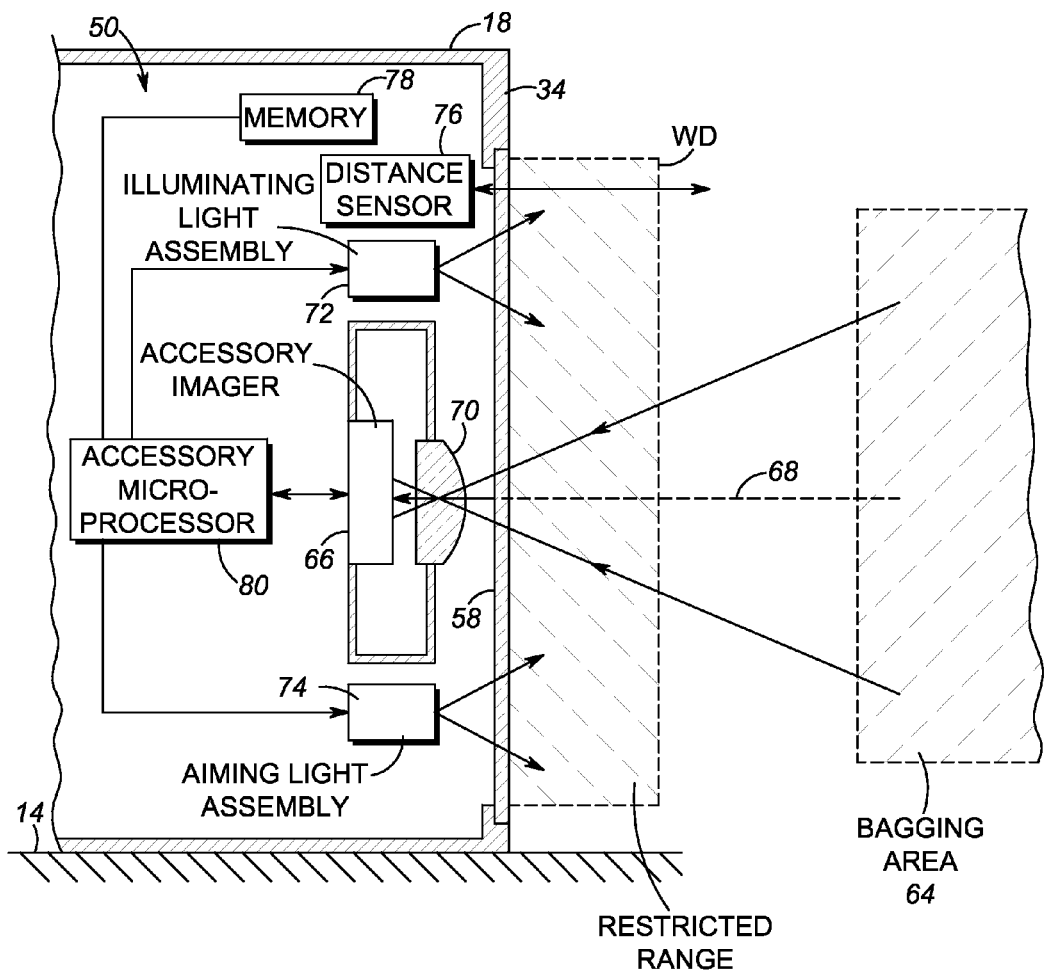
FIG. 4 is a broken-away schematic diagram of various components of the accessory reader of FIG. 1.

Turning now to FIGS. 2 and 4, the built-in accessory reader 50 has an accessory window 58 preferably supported on a side wall 34 of the raised housing portion 18. The accessory window 58 is positioned to face the bagging area 64 and to be accessible to the customer 20 for enabling the customer to interact with the accessory reader 50. The workstation windows 12, 16 bound a zone through which the products 26 are passed along a transaction path to the bagging area 64, and the accessory window 58 is upright, planar and faces downstream of the transaction path. Preferably, the accessory window 58 lies in a vertical plane that is perpendicular to the horizontal window 12, and that also intersects the plane of the upright window 16. In use, the customer 20 processes each additional target on each transaction-related item 52 past the accessory window 58 by swiping the additional target on each transaction-related item 52 across the accessory window 58, or by presenting the additional target on each transaction-related item 52 by holding it momentarily steady at the accessory window 58.

As schematically shown in FIG. 4, the accessory reader 50 also has a data capture assembly for capturing additional target data of the additional target on each item 52 related to the transaction. The data capture assembly of the accessory reader 50 includes an image sensor or imager 66 and an imaging lens assembly 70 mounted in front of the imager 66. The imager 66 is a solid-state device, for example, a CCD or a CMOS imager and has a linear or area array of addressable image sensors or pixels, preferably of submegapixel or super-megapixel size, having a reading field of view that diverges away from the window 58 in both horizontal and vertical directions. The imaging lens assembly 70 has a plurality of lenses, e.g., a Cooke triplet, arranged along an optical axis 68 that is generally perpendicular to the window 58 and is operative for capturing light through the window 58 from the additional target on the transaction-related item 52 located in a restricted range of working distances, as described below, along the optical axis 68, as measured from the window 58 to a maximum working distance WD. In a preferred embodiment, the restricted range begins at, or in the immediate vicinity of, the window 58 (zero inches) and ends at the maximum working distance WD of about six inches from the window 58.

An illumination light assembly 72 is also mounted in the accessory reader 50 and preferably includes a plurality of illumination light sources, e.g., two or more light emitting diodes (LEDs) arranged around the imager 66, and a corresponding number of illumination lenses mounted in front of the illumination LEDs to uniformly illuminate the additional target on item 52 with illumination light.

An aiming light assembly 74 is also mounted in the accessory reader 50 and is operative for projecting an aiming light pattern or mark, such as a "crosshair" pattern, with aiming light from an aiming light source, e.g., an aiming laser or one or more LEDs, through aiming lenses on the additional target on item 52. The customer 20 aims the aiming pattern on the additional target on item 52 to be imaged. A distance sensor 76 is optionally mounted in the accessory reader 50 and is operative for measuring a target distance to the additional target on item 52, as further described below.

Returning to FIG. 4, the imager 66, the illumination light assembly 72, the aiming light assembly 74 and the distance sensor 76 are operatively connected to a controller or programmed accessory microprocessor 80 operative for controlling the operation of these electrical components. A memory 78 is connected and accessible to the accessory microprocessor 80. In operation, the accessory microprocessor 80 sends a command signal to energize the illumination light assembly 72 to pulse the illumination LEDs for a short time period of, for example, 500 microseconds or less, and to energize the imager 66 to collect illumination light reflected and/or scattered from the additional target on item 52 substantially only during said time period. A typical imager needs about 16-33 milliseconds to read the entire target image and operates at a frame rate of about 30-90 frames per second. The memory 78 can buffer multiple images of the additional target on item 52 captured over successive frames.

The accessory microprocessor 80 may be tasked with processing and decoding the image from the additional target on item 52, or the accessory microprocessor 88 may be tasked solely with acquiring the additional target data from the additional target on item 52, and for sending the acquired additional target data to the workstation microprocessor 44, which then is responsible for processing and decoding the image from the additional target on item 52. This processing and decoding of the image from the additional target on item 52 is performed by the workstation microprocessor 44 during the aforementioned standby mode, when the workstation microprocessor 44 is not occupied with processing and decoding the image from the target 28. Thus, image processing is advantageously tasked away from the accessory microprocessor 80 of the accessory reader 50 to the workstation microprocessor 44, and is performed when the workstation microprocessor 44 is not actively processing any images, i.e., during the standby mode. The image processing burden imposed on the accessory microprocessor 80 of the accessory reader 50 is thereby reduced.

Figure 5:
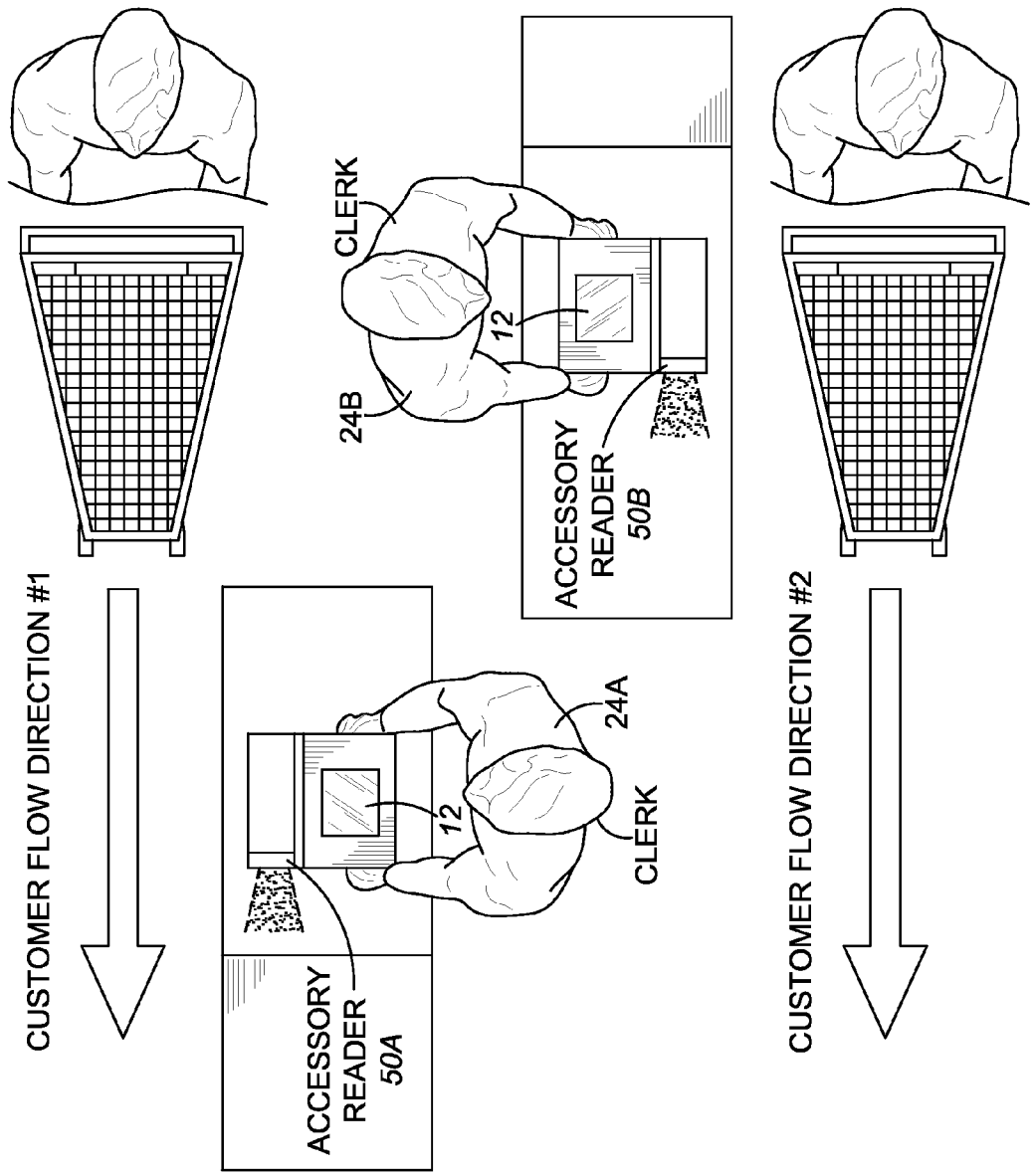
FIG. 5 illustrate that the aisle arrangements and position of bioptic units can be alternated in a retail environment.

As shown in FIG. 1, the optimum orientation of the customer scan module 50 is facing directly out the side of the bioptic vertical tower and downstream along the aisle so that the customer can scan their loyalty card and coupons near the payment terminal and bagging area. The position out the side allows the cashier to assist the customer with scanning and even to demonstrate. In retail environment, however, when the aisle arrangements and position of bioptic units are alternated as shown in FIG. 5, the customer side scanner (CSS) may need to be assembled in either the right or the left side of the tower so that the unit can always face downstream. This requires that there be a left side and right side version of customer side scanner and opens the potential for double the parts for making the working stations. For example, in FIG. 5, the workstation 10A in front of the clerk 24A requires that the customer side scanner 50A be located on the left side of the workstation 10A, the workstation 10B in front of the clerk 24B requires that the customer side scanner 50B be located on the right side of the workstation 10B.

Figure 6:
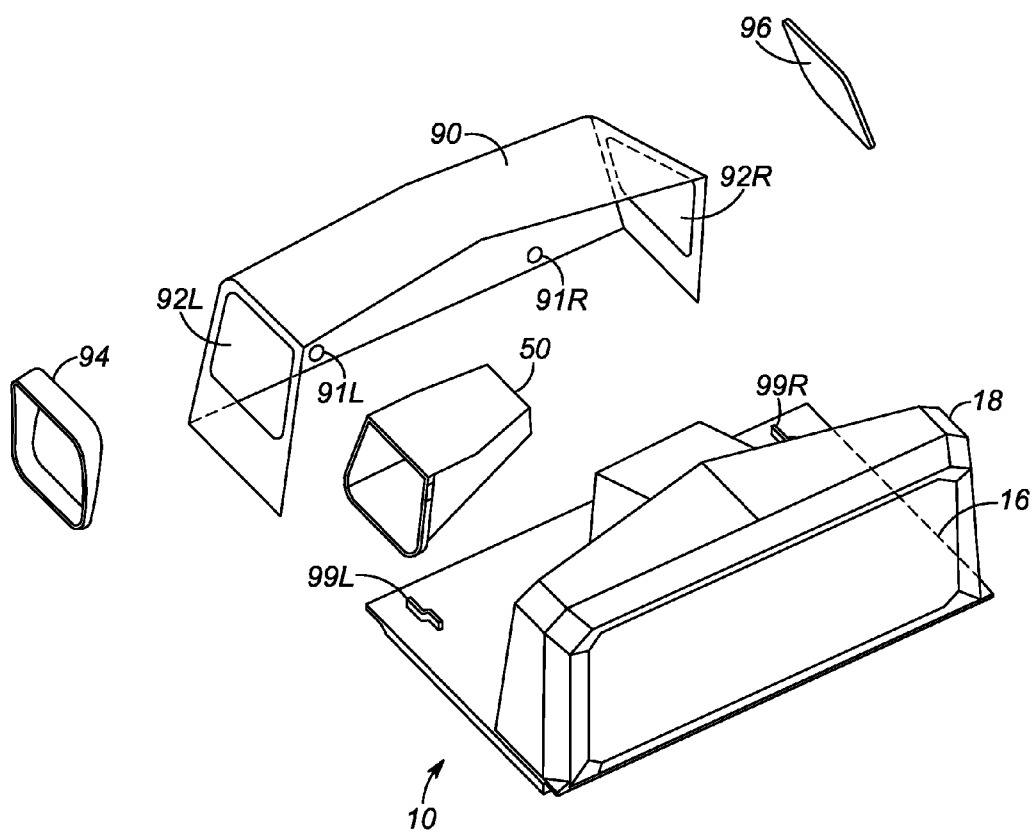
FIG. 6 depicts a rear cover for the bioptic workstation in accordance with some embodiments.

In one implementation as shown in FIG. 6, the workstation 10 includes structures that allow the same scanner be installed either on the on left side of the workstation or on the right side of the workstation. The workstation 10 in FIG. 6 includes a rear cover 90 that can be generally installed as part of the rear wall 48 of the workstation 10. The rear cover 90 includes a left opening 92L and a right opening 92R, which are respectively located on opposite side-walls of the rear cover 90. The left opening 92L is for exposing the scan module 50 if the scan module is installed on the left side of the workstation 10. The right opening 92R is for exposing the scan module 50 if the scan module is installed on the right side of the workstation 10A. The rear cover 90 may also include mounting features 91L and 91R to facilitate the installation of the scan module 50 on either the left side or the right side of the workstation 10. In one implementation, the left opening 92L and the right opening 92R essentially are reflectively symmetric about the center of the rear cover 90; the mounting features 91L and 91R essentially are also reflectively symmetric about the center of the rear cover 90. In some implementations, as shown in FIG. 6, the internal tower of the workstation 10 may also include symmetric mounting features 99L and 99R to facilitate the installation of the scan module 50 on either the left side or the right side of the workstation 10.

As shown in FIG. 6, the workstation 10 also includes a bezel 94 and a side cover 96. In some implementations, there are symmetric mounting features for the bezel and side cover that are identical on both sides so that the same bezel and side cover can be used on either side. During installation, if the customer side scanner (CSS) needs to be on the left side of the workstation 10, the scan module 50 will be installed on the left side with the bezel 94 covering the left opening 92L and the side cover 96 covering the right opening 92R. Similarly, if the customer side scanner (CSS) needs to be on the right side of the workstation 10, the scan module 50 will be installed on the right side with the bezel 94 covering the right opening 92R and the side cover 96 covering the left opening 92L. Additionally, the accessory scan module can have its own beeper and indicator LED, and in some implementations, there is a sound port and lightpipe in the bezel that interacts with the module so that the beeper and LED can function on either side.

In some implementations, the internal tower of the workstation 10 may also include symmetric cable guidance features that can be used to guide a cable to one of the two sides. During installation, the cable for connecting the scan module 50 is routed up from the side of the bioptic unit to the center of the internal tower and then into features for either the right or left configuration.

While the invention has been illustrated and described as embodied in a point-of transaction workstation for electro-optically reading indicia by using two imagers, it is not intended to be limited to the details shown, since various modifications and structural changes may be made without departing in any way from the spirit of the present invention.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed is:

1. A checkout system, comprising:
a bi-optical workstation operated by a clerk, the workstation having a first workstation window located in a generally horizontal plane, and a second workstation window located in a generally upright plane that intersects the generally horizontal plane, both of the workstation windows facing and being accessible to the clerk for enabling the clerk to pass products to be checked out in a transaction through the workstation to a bagging area, the workstation having a data capture arrangement for capturing through at least one of the workstation windows target data of targets associated with the products to be checked out by the clerk;

an accessory reader operated by a customer, the accessory reader having an accessory window facing the bagging area and being accessible to the customer for enabling the customer to interact with the accessory reader, the accessory reader having a data capture assembly for capturing additional target data of additional targets associated with items related to the transaction; and a rear cover having a first opening to allow light from the additional targets entering the accessory reader and having a second opening covered by a side cover, wherein the first opening and the second opening are located on opposite side-walls of the rear cover and are substantially identical in size.

2. The checkout system of claim 1, wherein the first opening and the second opening on the rear cover are substantially identical in size and in shape.

3. The checkout system of claim 1, wherein the rear cover further comprises a bezel attached to the first opening.

4. The checkout system of claim 3, wherein the rear cover further comprises symmetric mounting features for the bezel and side cover that are identical on both sides to allow the same bezel and side cover be interchangeably used on either side.

5. The checkout system of claim 3, wherein the accessory reader have its own beeper and indicator LED, wherein the bezel comprises at least one of a sound port and a lightpipe for interacting with the accessory reader to allow at least one of the beeper and the indicator LED function on either side.

6. The checkout system of claim 1, wherein the first opening of the rear cover is located at the left side of the second workstation window, and the second opening of the rear cover is located at the right side of the second workstation window.

7. The checkout system of claim 1, wherein the first opening of the rear cover is located at the right side of the second workstation window, and the second opening of the rear cover is located at the left side of the second workstation window.

8. The checkout system of claim 1, wherein the rear cover further comprises (1) a first mounting feature operative to mount the accessory reader at the left side of the second workstation window and (2) a second first mounting feature operative to alternatively mount the accessory reader at the right side of the second workstation window.

9. The checkout system of claim 8, wherein the first mounting feature and the second first mounting feature are substantially identical in structure.

10. The checkout system of claim 8, wherein the first mounting feature and the second first mounting feature essentially are reflectively symmetric about the center of the rear cover.

11. The checkout system of claim 1, further comprises an internal tower having substantially symmetric mounting features for mounting the accessory reader on either the left side of the second workstation window or on the right side of the second workstation window.

12. A checkout system, comprising:
a bi-optical workstation operated by a clerk, the workstation having a first workstation window located in a generally horizontal plane, and a second workstation window located in a generally upright plane that intersects the generally horizontal plane, both of the workstation windows facing and being accessible to the clerk for enabling the clerk to pass products to be checked out in a transaction through the workstation to a bagging area, the workstation having a data capture arrangement for capturing through at least one of the workstation windows target data of targets associated with the products to be checked out by the clerk;

an accessory reader operated by a customer, the accessory reader having an accessory window facing the bagging area and being accessible to the customer for enabling the customer to interact with the accessory reader, the accessory reader having a data capture assembly for capturing additional target data of additional targets associated with items related to the transaction; and a rear cover having a first opening and a second opening located on opposite side-walls of the rear cover, and wherein the rear cover further comprises (1) a first mounting feature operative to mount the accessory reader at the left side of the second workstation window and (2) a second first mounting feature operative to alternatively mount the accessory reader at the right side of the second workstation window.

13. The checkout system of claim 12, wherein the first opening and the second opening on the rear cover are substantially identical in size and in shape.

14. The checkout system of claim 12, wherein the first mounting feature and the second first mounting feature are substantially identical in structure.

15. A method comprises:

constructing a workstation having a first workstation window located in a generally horizontal plane, and a second workstation window located in a generally upright plane that intersects the generally horizontal plane, both of the workstation windows facing and being accessible to a clerk for enabling the clerk to pass products to be checked out in a transaction through the workstation to a bagging area, the workstation having a data capture arrangement for capturing through at least one of the workstation windows target data of targets associated with the products to be checked out by the clerk;

mounting an accessory reader near a first opening of a rear cover, wherein the accessory reader having an accessory window facing the bagging area and being accessible to a customer for enabling the customer to interact with the accessory reader, the accessory reader having a data capture assembly for capturing additional target data of additional targets associated with items related to the transaction;

placing a side cover on a second opening of the rear cover, wherein the first opening and the second opening are located on opposite side-walls of the rear cover and are substantially identical in size; and installing the rear cover on the back of the workstation.

16. The method of claim 15, further comprising attaching a bezel to the first opening of the rear cover.

17. The method of claim 15, wherein the first opening of the rear cover is located at the left side of the second workstation window, and the second opening of the rear cover is located at the right side of the second workstation window.

18. The method of claim 15, wherein the first opening of the rear cover is located at the right side of the second workstation window and the second opening of the rear cover is located at the left side of the second workstation window.

19. The method of claim 15, wherein said mounting an accessory reader near a first opening of a rear cover further comprise:

attaching the accessory reader to one of a first mounting feature and a second mounting feature on the rear cover, wherein the first mounting feature and the second mounting feature essentially are reflectively symmetric about the center of the rear cover.

20. The method of claim 15, wherein said mounting an accessory reader near a first opening of a rear cover further comprise:

attaching the accessory reader to an internal tower having substantially symmetric mounting features for mounting the accessory reader on either the left side of the second workstation window or on the right side of the second workstation window.

* * * * *